July 29, 1952 — T. G. AULIN — 2,604,697
CUTTING APPARATUS FOR LENSES, ESPECIALLY SPECTACLE-GLASSES
Filed April 5, 1945 — 4 Sheets-Sheet 1

Inventor:
T. G. Aulin

July 29, 1952 T. G. AULIN 2,604,697
CUTTING APPARATUS FOR LENSES, ESPECIALLY SPECTACLE-GLASSES
Filed April 5, 1945 4 Sheets-Sheet 2
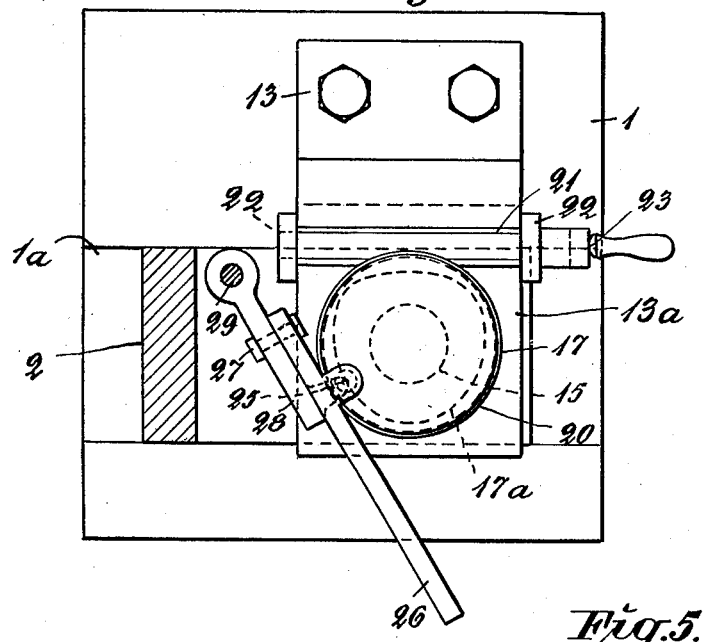
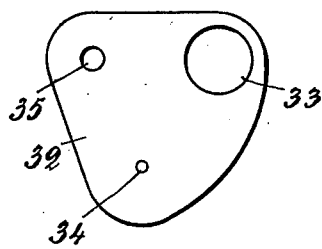
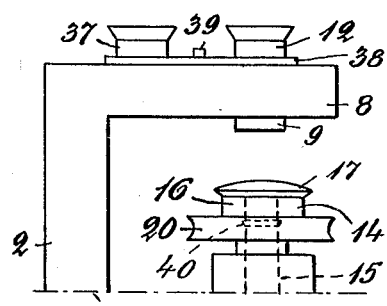
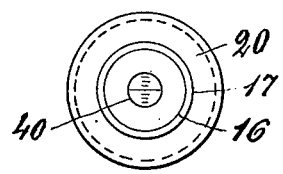

July 29, 1952        T. G. AULIN        2,604,697

CUTTING APPARATUS FOR LENSES, ESPECIALLY SPECTACLE-GLASSES

Filed April 5, 1945        4 Sheets-Sheet 4

INVENTOR
T. G. AULIN

Patented July 29, 1952

2,604,697

UNITED STATES PATENT OFFICE 2,604,697

CUTTING APPARATUS FOR LENSES, ESPECIALLY SPECTACLE-GLASSES

Tage Gunnar Aulin, Trollhattan, Sweden, assignor to J. P. Brandt Aktiebolag, Stockholm, Sweden, a company of Sweden Application April 5, 1945, Serial No. 586,727
In Sweden July 25, 1944

6 Claims. (Cl. 33—28)

In hitherto known cutting apparatus for spectacle-glasses, the rotatable supporting table for the lens is provided with a central, yielding pin, which thus marks the axis of rotation. Spectacle-glasses, when delivered from the maker are usually provided with a coloured mark, indicating the optical center of the glass and serving for guidance in placing the glass on the supporting table. Such simple devices are obviously inadequate to enable the glass to be cut in the right way, especially when some degree of decentering is desired. In order that the wearer of the eye-glasses or spectacles shall not feel some discomfort, the deviations from the prescribed placing of the glasses must not exceed certain tolerances, which, especially for powerful glasses, are very small.

One object of the present invention is to facilitate a correct cutting of the lens, that is, to provide means for determining the optical center of the lens (in the case of astigmatic glasses, the positions of the cylinder axes) in the required manner relatively to the intended edge-line.

A further object is to enable an exact decentering to the desired degree, of the optical center of the lens in the contour to be cut.

A still further object of the invention is to enable exact cutting of astigmatic and bifocal glasses.

One characteristic feature of the device in accordance with the invention is that the preferably rotatable supporting table is provided with a central recess or bore for the transmission of a pencil of rays, produced by a projection device, through a lens arranged on said table whereby the position of the optical center (or cylinder axis) of the lens relatively to the edge-line or contour of the lens can be determined.

The accompanying drawings illustrate some embodiments of the invention.

Figure 3 is a vertical section on the broken line III—III in Figure 1.

Figure 4 is a detail of Figure 1 on a larger scale.

Figures 5 and 6 show diagrammatically in vertical elevation and plan view respectively, parts of another embodiment of the invention.

Figure 7:
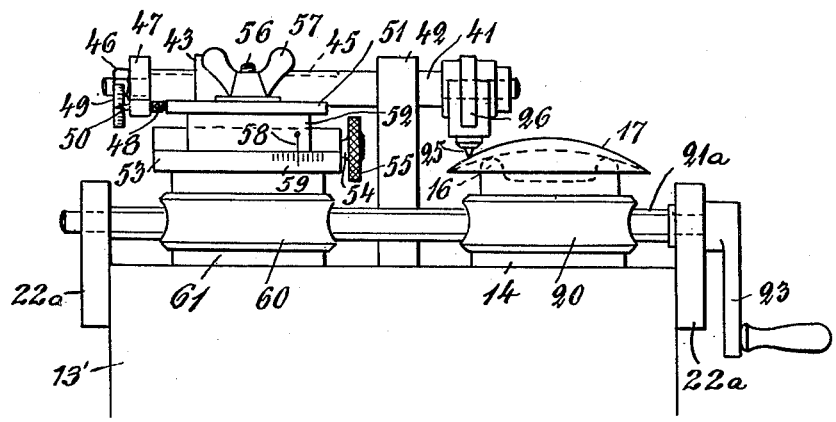
Figure 8:
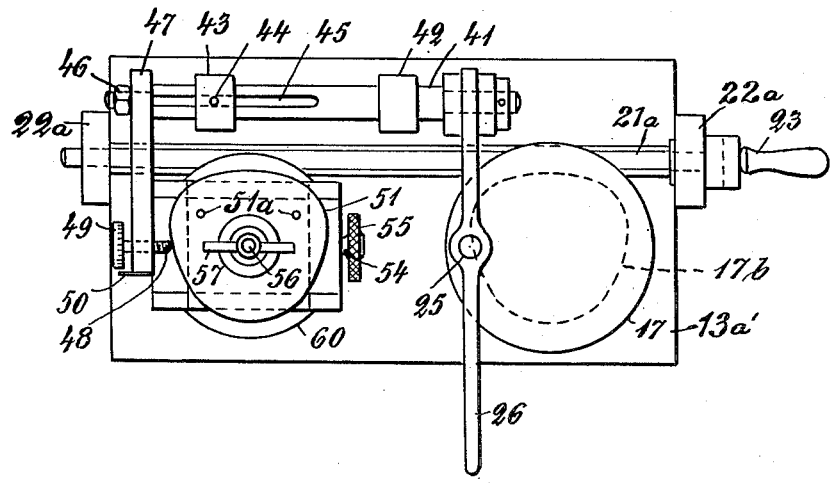
Figure 9:
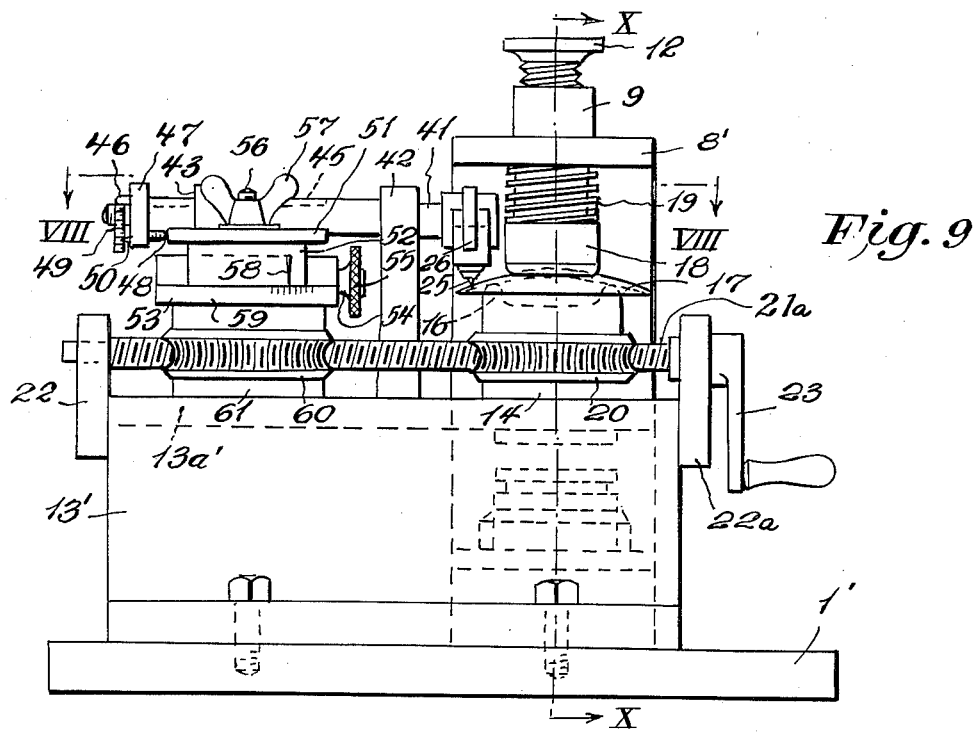
Figure 10:
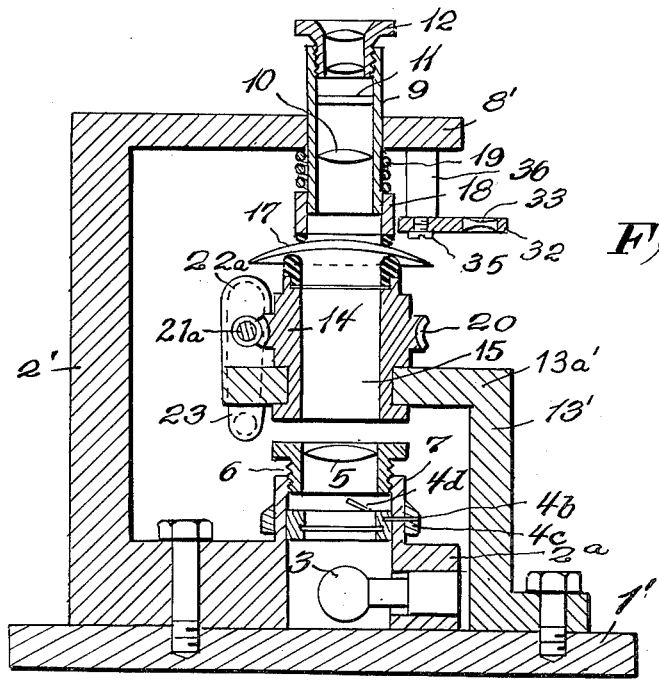

Figures 7 and 8 illustrate a side view and a horizontal view, respectively, of a further embodiment, and Figures 9 and 10 illustrate a side view and a sectional view on the line X—X of Fig. 9 of the device of Figs. 7 and 8 and including the optical system.

According to Figures 1-4 the apparatus comprises a base plate 1 carrying a frame structure 2. Arranged in the lower part 2a of the frame 2 is a projection device comprising a source of light 3 (a lamp), a ruled disc or reticle 4 and an optical system, here shown in the form of a lens 5 mounted in a holder 6 in a tube 7 forming part of the member 2a. The reticle 4 may consist of a black disc of glass having a cross, a series of crossing lines and circles or some other index engraved in its center to allow the rays of light to pass therethrough. The reticle 4 is mounted in a holder 4a which by means of a pin 4b attached to a ring 4c and guided in a groove 4d in the wall of the tube 7 may be displaced vertically within said tube. Thus, by screwing the ring 4c the level of the reticle may be adjusted.

Mounted in the upper part 8 of the frame 2 coaxially with the optical axis of the optical system 3, 4, 5 is a tube 9 containing a lens 10, a hair cross plate 11 and a magnifying glass system or ocular 12 axially displaceable in the tube 9. The projection device 3, 4, 5 transmits a pencil of rays which is caught in the tube 9, where the rays are refracted by means of the lens 10 so as to obtain an image of the reticle cross 4, which is viewed through the magnifying glass 12. The center of the hair cross 11 is arranged coaxially with that of the reticle 4.

Bolted to the base plate 1 is a vertical standard 13 having a horizontal branch 13a in which a supporting table 14 is mounted rotatably. The table 14 carries a seat or ring 16 of rubber or other soft material adapted to support the lens or glass 17 to be cut. The lens 17 is held firmly forced against the ring 16 by means of a holder or sleeve 18 actuated and carried by a spring 19 attached to the part 8. The table 14 has a central bore or recess 15 allowing the pencil of rays from the projection device 3, 4, 5 to the tube 9 to pass through the lens 17 on their way to the hair cross 11 and the magnifying glass 12. It is easily understood that if the lens 17 is introduced eccentrically into the path of rays it will cause the image of the reticle 4 to be decentered relatively to the hair cross 11. In order to center the optical axis of the lens 17 in said path of rays the lens is displaced on its seat 16 until the central index of the reticle 4, when observed through the magnifying glass 12, coincides with the hair cross 11. After centering, the lens is fixed in the centered position by means of the clamping holder 18.

The table 14 may be rotated by suitable means. To this purpose the drawing shows that the table is provided with a worm gear 20 adapted to mesh with a screw 21 which is journalled rotatably in bearing brackets 22 attached to the branch 13a. The screw 21 may be rotated by means of a handle 23.

The table 14 also supports an annular pattern or templet 24 having an external contour 17a (see dash lines in Figure 3) corresponding to the intended contour of the lens 17 to be cut. Of course, this pattern is arranged changeably so that it may be replaced by a pattern of any other desired contour. The inner periphery of the annular pattern engages a corresponding seat on the table 14 so that the pattern is firmly held on this table. Said seat is arranged centrally relatively to the axis of rotation of the table.

The cutting device may consist of a cutting diamond 25 mounted in a holder 26 which at 27 is pivoted to a lever 28 swingable on a bolt 29 or the like which is attached to the part 8. The lower end 28a of the lever 28 engages and is guided by the outer edge of the pattern 24.

It should be noted that the axis of the bore 15 is coaxial to the axis of rotation of the table 14. Hence, if the lens 17 has been centered in the path of rays in the manner described the optical center (or axis) of the lens is also centered relatively to said axis of rotation and thus to the pattern 24 which is arranged centrally on the table 14. When, in this position, the lens is cut by the diamond 25 upon rotation of the table 14 the new contour of the lens will coincide with or be parallel to the contour 17a and the optical center of the lens will be centered in this cut contour of the lens in the intended manner.

In some cases, a certain decentering of the optical center of the lens in the contour of the lens is desired. To this purpose, the frame 2 is arranged displaceably in a guide groove 1a in the base plate. The degree of displacement, and thus of the decentration, can be read on a nonius scale 31 on the base plate by means of an index 30 on the frame 2. After this displacement the lens 17 is centered in the path of rays in the manner described, whereupon the lens is cut by rotating the table 14. It is understood that in this manner the optical center of the lens will be decentered in the cut contour to a degree corresponding to the displacement of the projection device relatively to the table 14.

Should the intended shape of the cut lens deviate from a circular contour, the table 14 and the pattern 24 must be adjusted, before centering the lens 17 in the pencil of rays, so that decentering in the contour of the lens in the required direction is obtained.

Instead of thus displacing the pencil of rays, the table 14 may be displaced together with the appertaining pattern. Also in this case the same possibilities of decentering can be effected.

Figure 1:
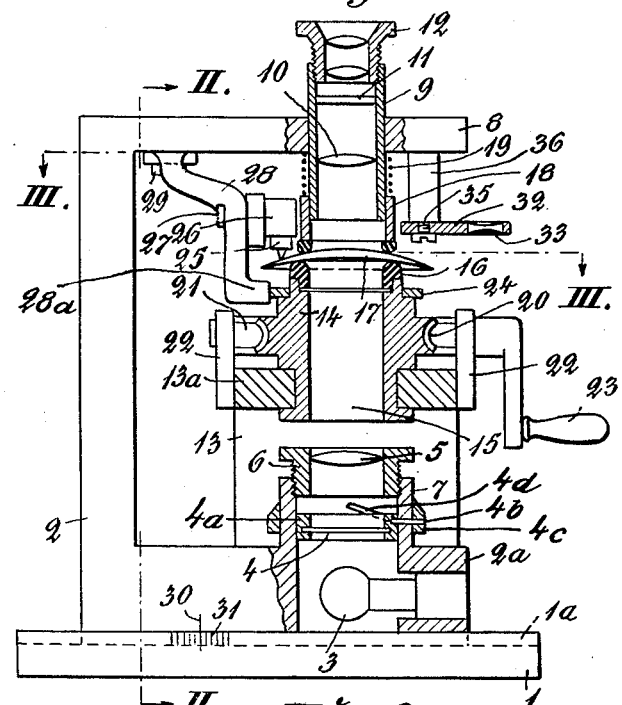
Figure 1 is a vertical elevation, partly in section, of an apparatus embodying the invention.

In order to obtain distinct images of the reticle 4 when centering astigmatic glasses, the apparatus may be provided with a diaphragm which can be introduced into the pencil of rays, and which can be placed either in front of or behind the lens 17. Figures 1 and 4 show an example of such a diaphragm arrangement comprising a plate 32 which is rotatable on a pivot 35 attached to a bolt 36 or the like carried by the part 8. This plate has a small aperture 34 acting as a diaphragm when the plate 32 is swung into the center of the path of rays passing to the ocular 12 (it being assumed that the holder 18 is lifted to allow this movement). The plate also carries a lens 33 for the purpose indicated below.

So-called bifocal glasses consist of two lens parts with different foci and usually also different optical centers. One of these parts is intended for seeing at a distance, and the other for seeing at close quarters. In view of the convergence of the eyes when seeing at close quarters, it is desirable, in order that the spectacles or eye-glasses shall have the distance between the optical centers indicated by oculists in their prescriptions, that the optical centers of the "near" parts of the bifocal glasses should lie closer to one another than the optical centers of the "distant" parts. Hitherto as a rule, in the ordinary types of bifocal glasses, the connecting line between the optical centers of the "distant" and "near" parts has had an inclination at an angle of 5° to the symmetrical plane of the head of the person wearing the glasses. But, as the distances between these optical centers vary very considerably (from scarcely any distance at all to a distance of about 10 mm.), it is obvious that this inclination should be varied. When the distance between the optical centers of the "distant" and "near" parts has been measured with the aid of a suitable apparatus, the necessary turning can be computed by a simple calculation.

Figure 2:
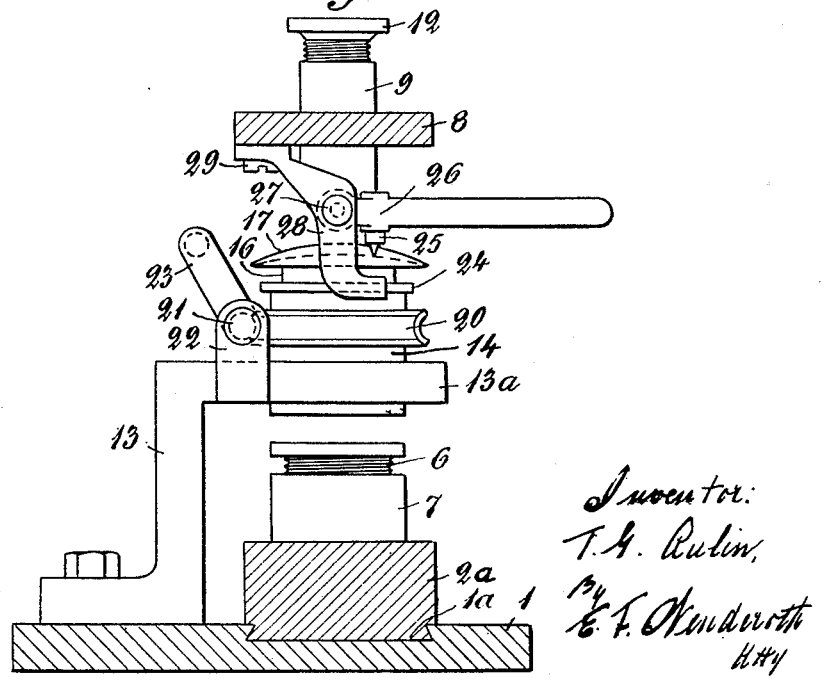
Figure 2 is a section on the line II—II in Figure 1.

If a bifocal glass is placed on the supporting table 14 in the device shown in Figures 1 to 3, a distinct image will, for example, be obtained in the ocular 12 through the "distant" part, whilst the image viewed through the "near" part will be blurred. The blurring, however, can be eliminated by placing in front of the "near" part a negative lens (for example the lens 33 in the rotatable plate 32, Figures 1 and 4) of such power that the image will be brought out in quite sharp relief also through this part. In this way a bifocal glass produces two images, which, as we know, fall on the hair-cross in the tube 9. The hair cross is arranged in the plate 11 as shown in Figure 1. By turning the ocular 12 the required number of degrees relatively to the symmetrical plane of the lens contour, and then (by turning the lens 17) causing the two images to fall on one of the axes of the hair-cross, the desired position of the two lens parts relatively to the lens contour can be obtained.

Another important condition in bifocal glasses is that the lines of demarcation between the "distant" and "near" parts of the glasses should lie at a level, relatively to the so-called zero-line ($x$-line) of the spectacles, approximately corresponding to a line drawn across the attachments of the spectacle rims (the nose-bridge).

For this purpose, the device in accordance with the invention may be provided with two oculars 12 and 37 placed on a revolving disc 38, as shown quite diagrammatically in Figure 5. One of these oculars, 37, has such a focus that one can simultaneously observe through it the line of demarcation and an index disc (reticle) or ruled disc 40 (Fig. 6) placed in the recess or bore 15 of the table 14, and provided with a graduated scale, the zero line of which crosses the axis of rotation of the table. The distance between the line of demarcation and the zero axis, which (depending on the different position in which a pair of spectacles is worn by different persons) varies in different cases, can then easily be adjusted in the same way for both spectacle-glasses with the aid of the ruled disc or index 40 in the recess 15.

The lenses required during the cutting of the bifocal glasses can be introduced at a suitable place in the path of the rays in front of or behind the glass 17, which is to be cut. As already described, Figure 4 shows one example of arranging such a lens 33, preferably arranged interchangeably so as to be replaceable by lenses of different kinds and strengths. By turning the ring 4c and thus adjusting the level of the reticle 4 the image viewed through the "distant" part can, for example, be focussed in sharp relief, the power of the glass being at the same time ascertained in known manner. As the difference between the "distant" and "near" part may vary from 0.5 to 5 dioptrics, several extra interchangeable lenses 33 will, in all cases, be required in order to obtain a distinct image through the "near" part. The number, however, can be restricted to ten, in which case the difference between the different powers of the lenses in the series will be 0.5 dioptrics. It is in fact unnecessary to attain perfect distinctness: some slight blurring of the image is permissible in focussing.

Figures 7 and 8 show a modification of the apparatus described with reference to Figures 1 to 3. The principal idea underlying the construction shown in Figures 7 and 8 is that the decentering of the optical center of the lens or glass 17 is effected by decentering the pattern instead of the path of rays or the table 14. According to Figures 7 and 8 the pattern is arranged on a rotatable support separately from the support or table 14 for the lens 17. The holder 26 for the cutting tool 25 is arranged swingably on a shaft 41 guided slidably in axial direction in brackets 42 and 43 carried by the part 13a'. The bracket 43 may be provided with a pin 44 engaging a longitudinal groove 45 in the shaft 41 so as to prevent said shaft from rotating. Attached to the end of shaft 41 by means of a nut 46 is a rod 47 carrying a set screw 49, the end 48 of which engages the periphery of the pattern or templet 51. The screw 49 may be provided with a scale so that the adjusted position of the screw may be read by means of an index finger 50.

The pattern 51 has apertures 51a for guide pins attached to a slide block 52 carrying the pattern. The pattern is secured to this block by means of a screw 56 and a wing nut 57. The block 52 is slidably mounted in a supporting guide 53 resting on and attached to a table 61 provided with a worm gear 60 adapted to mesh with the screw 21 which drives the tables 14 for the lens 17.

It is clearly seen that when the screw 21a is rotated both tables 14 and 61 will rotate and the tool 25 will cut the lens 17 along a contour 17b corresponding to the contour of the pattern 51.

In order to indicate the relative position of the block 52 and the guide 53 the latter has a scale 59 while the block 52 has an index 58. When the index 58 registers with the 0-line of the scale 59, as shown in Figure 7, the pattern 51 is centered to the axis of rotation of the table 61. Thus, if the optical center of the lens 17 is centered on the table 14 in the manner described, the said optical center will be centered in the contour cut by the tool 25. If a decentering is desired the pattern 51 is decentered relatively to the axis of table 61 by means of an adjusting screw 54 which may be rotated by a knob 55 so as to displace the block 52 in the guide 53 to the desired degree indicated on the scale 59. When the tables 61 and 14 now are rotated with the pattern 51 in this decentered position the tool 25 will cut a contour which is decentered relatively to the optical center of the lens 17. It should be understood that this result is achieved without decentering the lens 17 itself, said lens always lying centered relatively to the axis of the table 14 and of the optical axis of the projection system, whilst the diamond 25 moves eccentrically in relation to both these axes. The advantage of this alternative procedure is that it affords facilities for causing the glass or lens 17 to rotate before cutting, in order, by viewing the image falling on the hair cross in the tube 9, to determine whether the lens 17 actually lies exactly centered in relation to the axis of the projection system or that of the support 14. The lens 17 will lie centrally when the image of the reticle 4 falling on the index disc or hair cross 11 lies constantly still despite the rotation of the lens.

If it is desired to cut the lens or glass smaller or larger than the pattern an adjustment is made of the screw 49 engaging the periphery of the pattern. Such adjustment will cause a displacement of the cutting tool 25 relatively to the center of the glass so that the tool will cut along a contour 17b lying at the desired radius.

Figures 7 and 8 show how the pattern may be decentered in one direction by means of the screw 54, 55. If necessary, however, a decentration may also be effected in a direction perpendicularly to the first mentioned direction by allowing the block 52 to slide in a further guide perpendicular to the guide 53.

Figures 9 and 10 show the embodiment of Figs. 7 and 8 but combined with the optical system such as shown in Fig. 1. In these views the members identified by identical reference numerals are the same as those in other views, whereas members 8', 13', 13a' and 22a correspond to parts 8, 13, 13a and 22 of Figures 1 and 7 as will be apparent from the drawings.

The invention is not limited to any particular form of construction: it may be executed in many different ways. The essential feature of the invention is that the lens or glass which is to be cut is placed on the supporting table with the aid of a pencil of rays passing through the lens, whereby the defects inevitably entailed by the hitherto usual cutting methods with a mechanical marking of the lens are completely eliminated, and the lens can be adjusted in a perfectly correct manner on the supporting table before cutting. The invention, of course, is not confined to cutting apparatus in which the cutting is effected by a diamond: it is applicable also to cutting effected in other ways, e. g. in grinding machines by means of a rotating grinding wheel or any other kind of cutting or grinding tools.

What I claim is:

1. In a cutting apparatus for lenses, the combination of a rotatable lens holder for a lens to be cut, a rotatable pattern holder for a pattern template according to which said lens should be cut, the rotational axes of said lens holder and said pattern holder being mutually parallel and spaced at a fixed, predetermined distance from each other, means for synchronously rotating said lens holder and pattern holder, a movable feeler for engaging the edge of a pattern inserted in said pattern holder, a cutting tool controlled by said feeler for cutting a lens inserted in said lens holder, optical means for centering the lens to be cut when inserted in said lens holder, so that the optical axis of said lens will coincide with the rotational axis of the lens holder, said optical means comprising a projecting device for projecting a narrow pencil of rays along the rotational axis of said lens holder, a first reticle device in the path of said pencil of rays, an aperture in said lens holder covered by the lens inserted in said holder, a second reticle device in said path, an ocular through which the images of both said reticle devices can be viewed superimposed one upon the other, whereby coincidence of the two images indicates correct centering of said lens, mechanical means for centering the pattern inserted in said pattern holder so that a predetermined axis of said pattern will coincide with the rotational axis of said pattern holder, displacing means for varying the relative space between the optical axis of said lens and the predetermined axis of said pattern, said displacing means comprising an adjusting screw and a scale for accurately measuring the amount of such variation, for the purpose of ensuring that said last mentioned relative space will differ from said predetermined relative space between said rotational axes of said lens holder and said pattern holder during the cutting operation.

2. In a cutting apparatus for lenses, a rotatable lens holder for the lens to be cut, a rotatable pattern holder for a pattern template according to which said lens is to be cut, the rotational axes of said lens holder and said pattern holder being parallel and arranged at a fixed predetermined relative distance, means for synchronously rotating said lens holder and said pattern holder, a movable feeler for engaging the edge of a pattern inserted in said pattern holder, a cutting tool controlled by said feeler for cutting a lens inserted in said lens holder, optical means for centering the lens to be cut when inserted in said lens holder, so that the optical axis of the lens will coincide with the rotational axis of the holder, mechanical means for centering a pattern inserted in said pattern holder so that a predetermined axis of said pattern will coincide with the rotational axis of said pattern holder, displacing means for producing relative displacement between the axis of said lens support and said pattern, said displacing means comprising an adjusting screw and a readable scale for accurately measuring the amount of such displacement, for the purpose of causing the relative distance between the optical axis of the lens and said predetermined axis of the pattern to differ from the distance between said rotational axes of said lens holder and said pattern holder during the cutting operation.

3. In a cutting apparatus for lenses, a base plate, a first frame structure carrying a rotatable pattern holder and a rotatable lens holder, the axes of rotation of said holders being laterally displaced and mutually parallel, a second frame structure mounted on said base plate, said second frame structure carrying an optical system for determining the optical axis of a lens inserted in said lens holder of said first frame structure, means for synchronously rotating said lens holder and said pattern holder, a movable feeler arranged to bear against the periphery of a pattern inserted in said pattern holder, a cutting tool controlled by said feeler for cutting a lens inserted in said lens holder, and means for displacing said pattern holder relative to the rotational axis thereof, said means including a scale and an index for determining the amount of such displacement.

4. A cutting apparatus for lenses according to claim 3 comprising a guide firmly mounted relative to the rotational axis of said pattern holder, a slide block slidably arranged in said guide, an adjusting screw for controlling the sliding of said slide block in said guide, a scale and an index for measuring the relative position of said slide block relative to said guide, said pattern holder being mounted on said slide block.

5. A cutting apparatus for lenses according to claim 3 in which said second frame structure has a lower part beneath said lens holder carried by said first frame structure, and an upper part above said lens holder, said lower part carrying a source of light, a lens system and a first reticle, all belonging to said optical system, and said upper part carrying a second reticle and an adjustable ocular for viewing the images of both reticles superimposed one upon the other, means for the longitudinal displacing of said first reticle along its optical axis, a diaphragm with a narrow aperture and means for introducing said diaphragm into the path of light between said lens holder and said second reticle, for the purpose of sharpening the image of said first reticle.

6. A cutting apparatus according to claim 3, in which said second frame structure has a lower part beneath said lens holder carried by said first frame structure, and an upper part above said lens holder, said lower part carrying a source of light, a lens system and a first reticle, all belonging to said optical system, and said upper part carrying a second reticle and an adjustable ocular for viewing the images of both reticles superimposed one upon the other, means for longitudinally displacing said first reticle along its optical axis, a diaphragm with a narrow aperture, said diaphragm being further provided with an aperture for lenses of different strength to be inserted therein, and means for introducing said aperture into the path of light between said lens holder and said second reticle for the purpose of obtaining a sharp image of said first reticle on inserting a bifocal lens into said lens holder.

TAGE GUNNAR AULIN.

REFERENCES CITED

The following references are of record in the file of this patent:

UNITED STATES PATENTS

| Number | Name | Date |
| --- | --- | --- |
| 1,042,346 | Henle | Oct. 22, 1912 |
| 1,581,883 | Steinle | Apr. 20, 1926 |
| 1,873,526 | Allen | Aug. 23, 1932 |
| 1,984,121 | Drescher | Dec. 11, 1934 |
| 2,341,201 | Ballard | Feb. 8, 1944 |

FOREIGN PATENTS

| Number | Country | Date |
| --- | --- | --- |
| 266,767 | Great Britain | Mar. 7, 1927 |
| 487,611 | Great Britain | June 23, 1938 |